United States Patent
Maddali

(10) Patent No.: US 6,850,043 B1
(45) Date of Patent: Feb. 1, 2005

(54) EXCESSIVE VOLTAGE PROTECTOR FOR A VARIABLE FREQUENCY GENERATING SYSTEM

(75) Inventor: Vijay Maddali, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 24 days.

(21) Appl. No.: 10/354,870

(22) Filed: Jan. 30, 2003

(51) Int. Cl.[7] .............................. H02P 9/30; H02P 9/04; H02H 7/06; H02H 7/08
(52) U.S. Cl. .............................. 322/25; 322/22; 322/28; 322/37
(58) Field of Search .............................. 322/17, 22–25, 322/28, 37

(56) References Cited

U.S. PATENT DOCUMENTS

| | | | | |
|---|---|---|---|---|
| 3,973,171 A | * | 8/1976 | Howell | 361/45 |
| 4,001,646 A | * | 1/1977 | Howell | 361/45 |
| 4,006,398 A | * | 2/1977 | Gritter | 322/47 |
| 4,006,399 A | * | 2/1977 | Studtmann | 322/47 |
| 4,044,296 A | * | 8/1977 | Dhyanchand et al. | 322/25 |
| 4,159,499 A | * | 6/1979 | Bereskin | 361/42 |
| 4,219,769 A | * | 8/1980 | Macfarlane et al. | 322/28 |
| 4,322,630 A | * | 3/1982 | Mezera et al. | 290/40 C |
| 4,326,159 A | * | 4/1982 | Aotsu et al. | 322/19 |
| 4,336,486 A | * | 6/1982 | Gorden et al. | 322/63 |
| 4,403,292 A | * | 9/1983 | Ejzak et al. | 700/297 |
| 4,410,848 A | * | 10/1983 | Frierdich | 322/25 |
| 4,442,396 A | * | 4/1984 | Hucker | 322/21 |
| 4,477,765 A | * | 10/1984 | Glennon et al. | 322/20 |
| 4,486,801 A | | 12/1984 | Jackovich et al. | 361/21 |
| 4,559,487 A | | 12/1985 | Sims et al. | 322/24 |
| 4,567,422 A | * | 1/1986 | Sims | 322/25 |
| 4,658,200 A | * | 4/1987 | Kouge | 322/25 |
| 4,728,879 A | * | 3/1988 | Rounce | 322/25 |
| 4,764,838 A | * | 8/1988 | MacFarlane | 361/21 |

(List continued on next page.)

Primary Examiner—Joseph Waks
Assistant Examiner—Pedro J. Cuevas
(74) Attorney, Agent, or Firm—Carlson, Gaskey & Olds

(57) ABSTRACT

An excessive voltage protection system for a variable frequency generating system detects single point failures in a generator control unit and prevents excessive voltages at a point of regulation (POR) in the system. The generator control unit is designed to detect failures, such as a loss of three-phase sensing capability, switch failure in the exciter drive circuit, and/or exciter current loop failure. If a failure occurs, the generator control unit stops operation of the exciter drive circuit, preventing the voltage at the POR from rising to undesirable levels.

12 Claims, 5 Drawing Sheets

U.S. PATENT DOCUMENTS

| | | | | |
|---|---|---|---|---|
| 4,788,462 A | | 11/1988 | Vesce et al. | 327/546 |
| 4,806,841 A | * | 2/1989 | Lee et al. | 322/29 |
| 4,839,575 A | * | 6/1989 | MacFarlane | 322/25 |
| 4,904,919 A | * | 2/1990 | McNaughton | 318/798 |
| 5,031,086 A | * | 7/1991 | Dhyanchand et al. | 363/37 |
| 5,057,962 A | * | 10/1991 | Alley et al. | 361/24 |
| 5,153,498 A | * | 10/1992 | Parro | 322/25 |
| 5,172,038 A | * | 12/1992 | Page et al. | 318/373 |
| 5,187,417 A | * | 2/1993 | Minnich et al. | 318/254 |
| 5,285,147 A | | 2/1994 | Rashid | 322/28 |
| 5,294,879 A | * | 3/1994 | Freeman et al. | 322/23 |
| 5,325,043 A | | 6/1994 | Parro | 322/23 |
| 5,343,379 A | | 8/1994 | Kirchberg et al. | 363/41 |
| 5,390,068 A | | 2/1995 | Schultz et al. | 361/95 |
| 5,400,205 A | | 3/1995 | Ligon et al. | 361/62 |
| 5,422,778 A | | 6/1995 | Good et al. | 361/92 |
| 5,497,071 A | * | 3/1996 | Iwatani et al. | 322/28 |
| 5,508,601 A | | 4/1996 | Good et al. | 322/37 |
| 5,550,456 A | | 8/1996 | Shekhawat et al. | 322/17 |
| 5,583,420 A | | 12/1996 | Rice et al. | 322/25 |
| 5,663,632 A | | 9/1997 | Roseman et al. | 322/59 |
| 5,675,237 A | * | 10/1997 | Iwatani | 322/28 |
| 5,686,819 A | * | 11/1997 | Iwatani et al. | 322/25 |
| 5,801,516 A | | 9/1998 | Rice et al. | 322/37 |
| 5,886,500 A | * | 3/1999 | Iwatani et al. | 320/104 |
| 5,936,440 A | | 8/1999 | Asada et al. | 327/110 |
| 6,008,599 A | * | 12/1999 | Beck | 318/254 |
| 6,014,016 A | * | 1/2000 | Maruyama et al. | 322/28 |
| 6,121,757 A | * | 9/2000 | Takahashi et al. | 322/28 |
| 6,344,734 B1 | * | 2/2002 | Iwatani et al. | 322/28 |
| 6,392,371 B1 | * | 5/2002 | Cheng et al. | 318/158 |
| 6,462,517 B2 | * | 10/2002 | Asada | 322/28 |
| 6,486,640 B2 | * | 11/2002 | Adams | 322/59 |
| 6,683,389 B2 | * | 1/2004 | Geis | 290/40 C |
| 6,734,653 B2 | * | 5/2004 | Taniguchi et al. | 322/24 |
| 6,737,836 B2 | * | 5/2004 | Namai | 322/44 |
| 6,756,770 B2 | * | 6/2004 | Watanabe et al. | 322/28 |
| 6,774,608 B2 | * | 8/2004 | Hofstetter et al. | 322/24 |
| 6,794,879 B2 | * | 9/2004 | Lawson et al. | 324/509 |

* cited by examiner

US 6,850,043 B1

EXCESSIVE VOLTAGE PROTECTOR FOR A VARIABLE FREQUENCY GENERATING SYSTEM

TECHNICAL FIELD

The present invention relates to systems that protect a circuit from high voltages, and more particularly to a protector that prevents excessive voltage buildup caused by a failure within a variable frequency generating system.

BACKGROUND OF THE INVENTION

Typically, commercial aircraft normally have a constant frequency generating system where the frequency of the voltage and current being sent through the feeder to the distribution system, and ultimately to the load, is kept constant within a narrow range, around 400 Hz. More recently, however, variable frequency systems are being incorporated into aircraft. These systems allow the frequency to range from as low as 375 Hz to 810 Hz while still maintaining the voltage magnitude at a constant level.

The variable frequency generator has a synchronous generator that generates an output voltage that is regulated by an exciter field current. The output voltage of the synchronous generator at the point of regulation (POR) is regulated by a generator control unit (GCU) that controls the exciter field current. The exciter field current in variable frequency generating systems is typically controlled by two solid state switches, such as MOSFET switches, that are simultaneously turned on and off via a pulse width modulated (PWM) signal that is sent to the gates of the switches. The duty cycle of the PWM signal is typically determined by a current loop circuit.

Because the variable frequency generator can generate high voltages, particularly when operating in the high frequency range, excessive voltage can build up to undesirably high levels at the POR due to single point failures, such as loss of three-phase voltage sensing capabilities, switch failure, or exciter current loop failure, within the generator control unit.

There is a desire for a system that can detect failures in a variable frequency generating system and prevent excessive voltage buildup at the POR caused by the failures.

SUMMARY OF THE INVENTION

The present invention is directed to a variable frequency generating system that detects single point failures in a generator control unit and prevents excessive voltages at the point of regulation (POR) in a system. The generator control unit controls the operation of an exciter drive circuit, which in turn controls the voltage level at the POR. In one embodiment, the generator control unit is designed to detect at least one failure type, such as a loss of three-phase voltage sensing capability, switch failure in the exciter drive circuit, and/or exciter current loop failure.

If a failure occurs, the generator control unit stops operation of the exciter drive circuit, preventing the voltage at the POR from rising to undesirable levels.

DETAILED DESCRIPTION OF THE EMBODIMENTS

Figure 1:
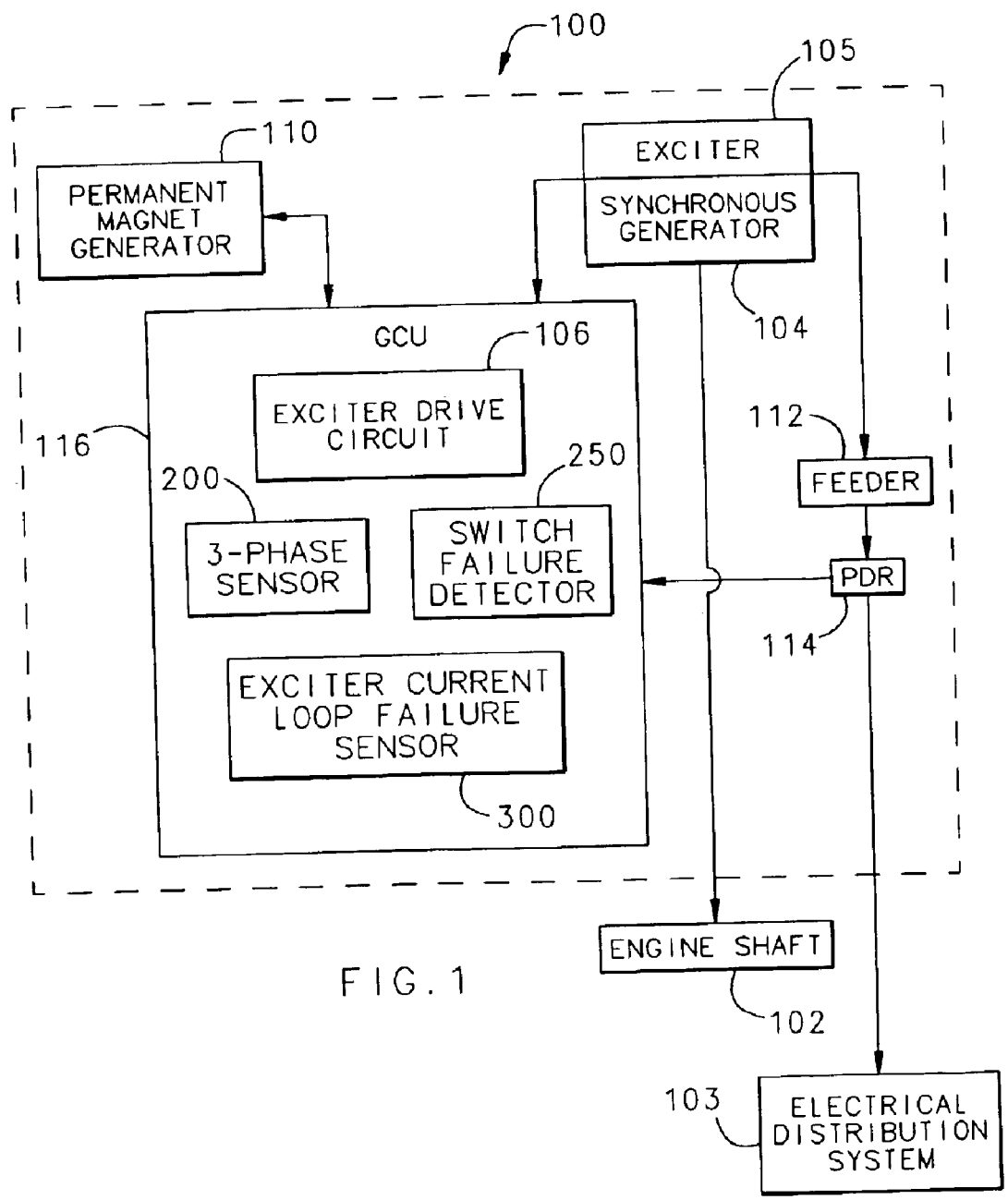
FIG. 1 is a block diagram illustrating a variable frequency generating system environment incorporating the present invention.

FIG. 1 illustrates a basic aircraft power generating system in which the invention operates. The system generally is a variable frequency generating system 100 that is coupled to a prime mover shaft, such as an aircraft engine shaft 102. The system 100 includes an electrical distribution system 103, a synchronous generator 104, an exciter 105, an exciter drive circuit 106, and a permanent magnet generator 110. In one embodiment, the exciter 105 is a synchronous machine with a stationary field and a rotating armature. As is known in the art, an engine (not shown) provides mechanical power to the synchronous generator 104 through the shaft 102; the generator 104 then converts the mechanical power into electrical power and provides the electrical power to electrical loads through a distribution system (not shown).

As shown in FIG. 1, the exciter 105 and synchronous generator 104 are incorporated into a single device. A feeder 112 carries current from the synchronous generator 104 to the load (e.g., the electrical distribution system). A point of regulation (POR) 114 is positioned close to the distribution system at a location where the voltage generated by the synchronous generator 104 is to be maintained at a predetermined level. The generator control unit 116 monitors the voltage at the POR 114 through sense wires and regulates the voltage at the POR 114 by controlling the operation of the exciter drive circuit 106 in the generator control unit 116.

Figure 2:
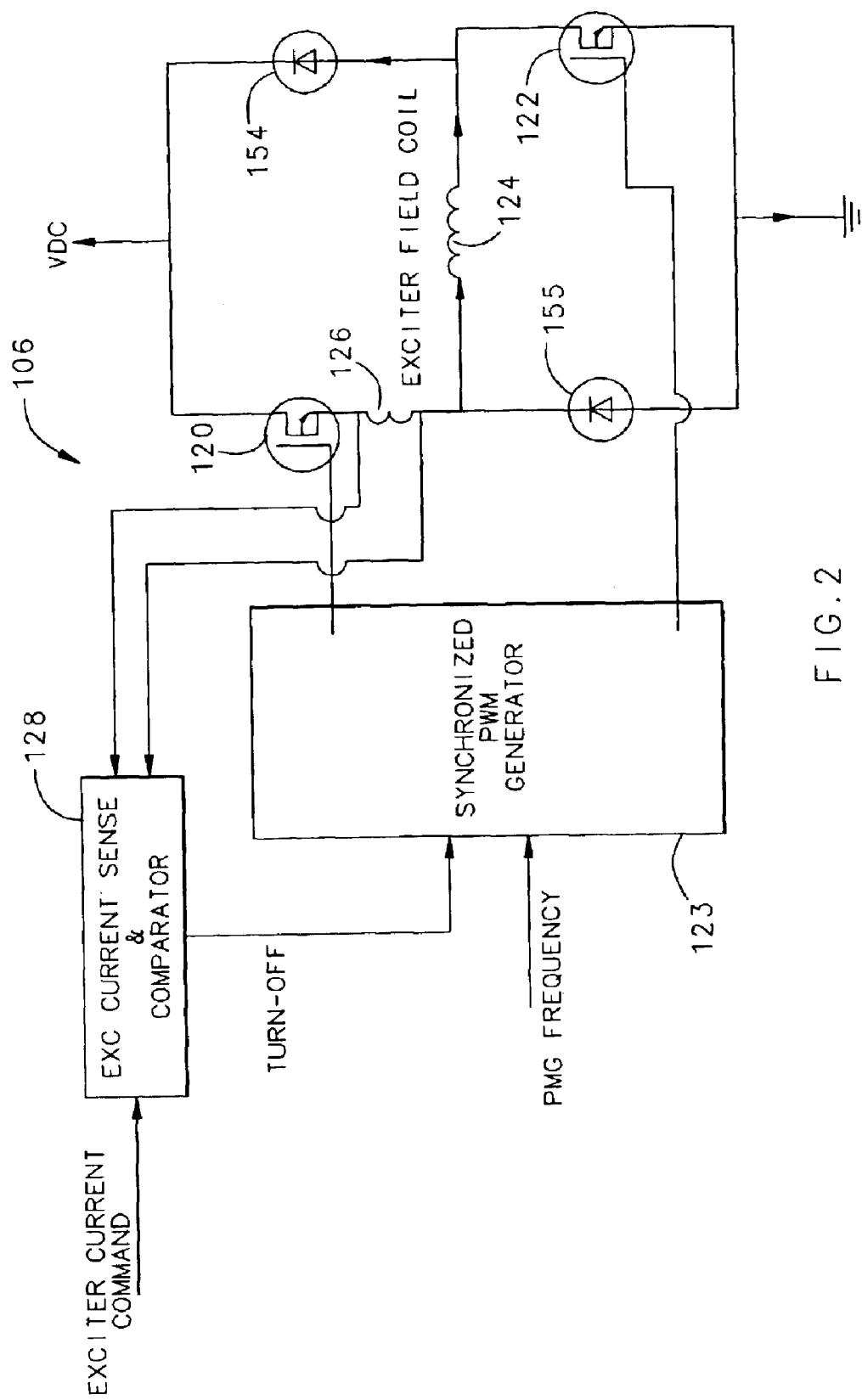
FIG. 2 is a representative diagram illustrating an exciter current loop circuit in greater detail.

FIG. 2 illustrates the exciter drive circuit 106 in greater detail. As shown in the Figure, the exciter drive circuit 106 is an exciter current loop circuit whose operation is regulated by the generator control unit 116. The exciter drive circuit 106 includes two solid-state switches 120, 122 that are turned on and off simultaneously by a PWM switching signal from a synchronized PWM generator 123. The PWM sign is synchronized with a permanent magnet generator (PMG) waveform if it is an integral multiple of the POR waveform to make sure that the switches 120, 122 are turned on and off at a known frequency that is synchronous with the POR waveform. By turning the switches 120, 122 on and off at a certain rate and duration, the exciter drive circuit 106 can control the amount of current going through an exciter field coil 124.

A current transformer 126 in the exciter drive circuit 106 is used to sense the current passing through the switches 120, 122. A comparator 128 compares an exciter current command, which comes from a voltage regulating function in the generator control unit 116, with the current passing through the switches 120, 122 to ensure that the current through the exciter field coil 124 is the same as the current requested by the exciter current command. If the exciter current command is higher than the current in the switches 120, 122, the comparator 128 will instruct the PWM generator 123 to keep the switches 120, 122 turned on. If the switch current is higher than the exciter current command, however, the comparator 128 will instruct the PWM generator 123 to turn the switches 120, 122 off to lower the switch current. The PWM generator 123 coordinates actual switch turn-on/turn-off commands in such a way that the switching is synchronous to the PMG waveform frequency and the pulse width is controlled by the comparator 128. By regulating the current through the exciter field coil 124 in this fashion, the exciter drive circuit 106 can generate a controlled output to the generator control unit 116.

Figure 3:
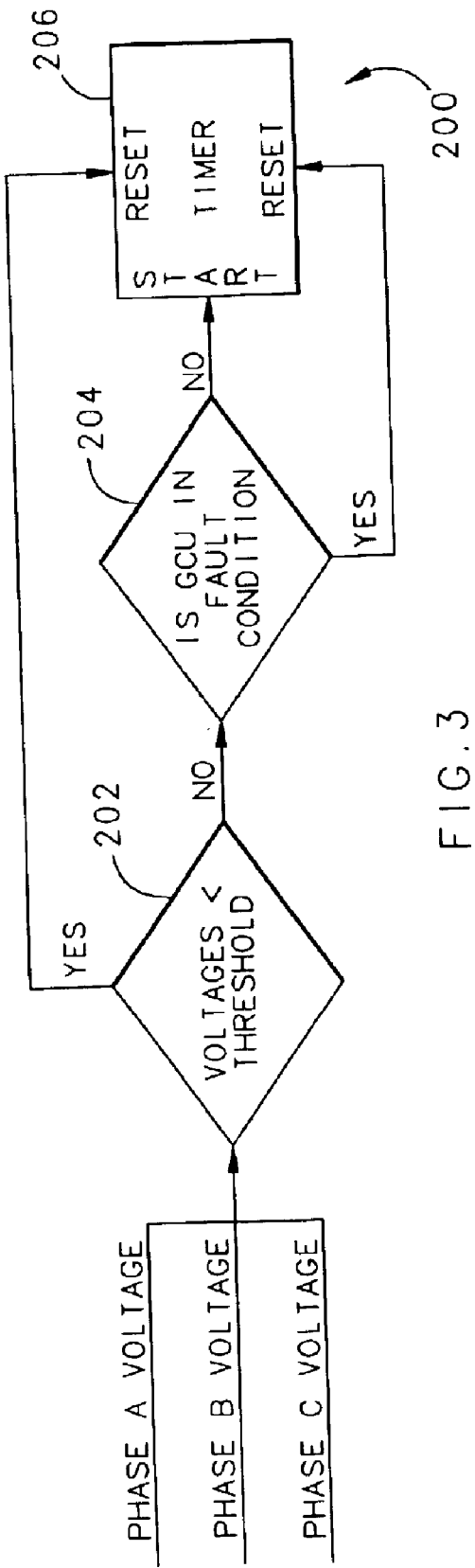
FIG. 3 is a block diagram illustrating a system that turns off an exciter current due to loss of three-phase voltage sensing capability.
Figure 4:
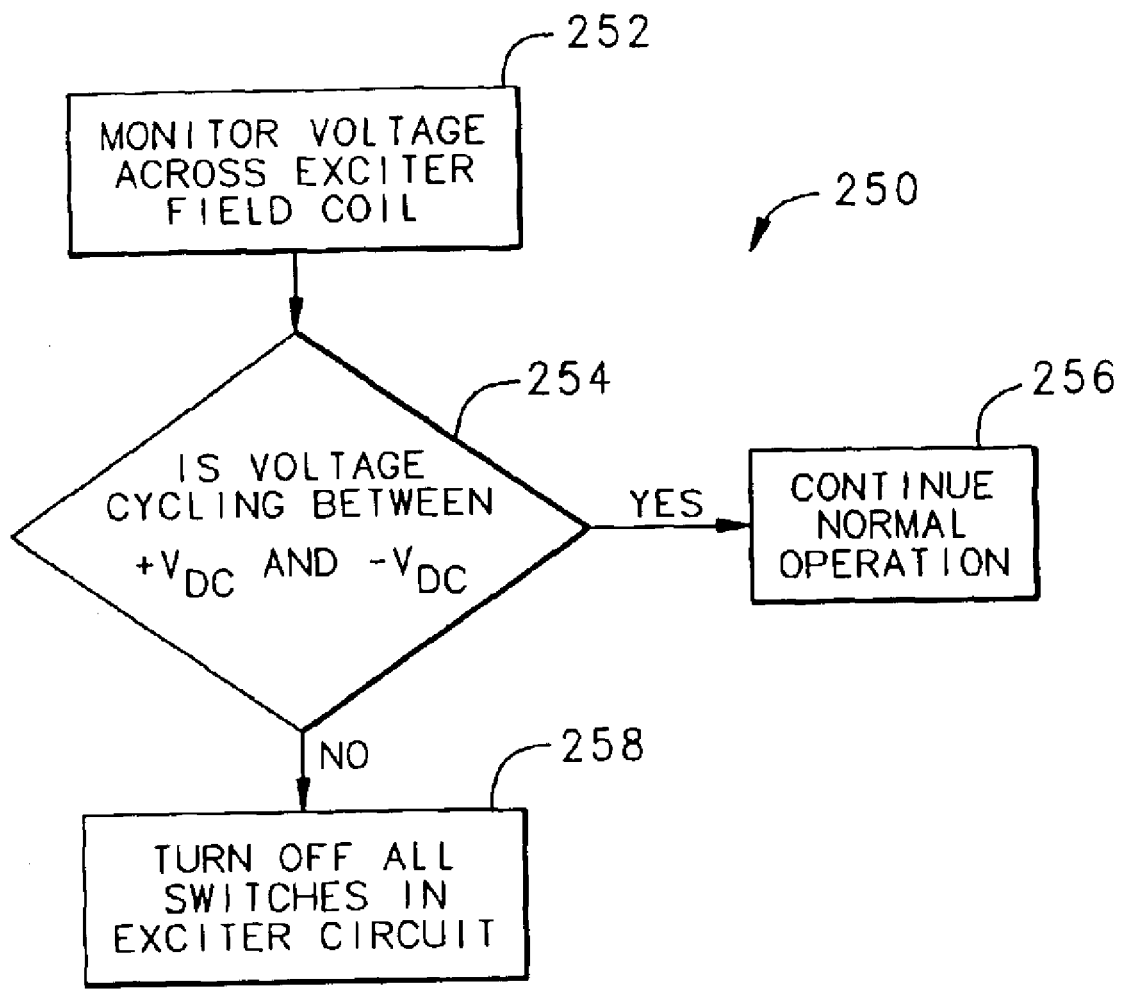
FIG. 4 is a block diagram illustrating a system that turns off an exciter current due to switch failure.
Figure 5:
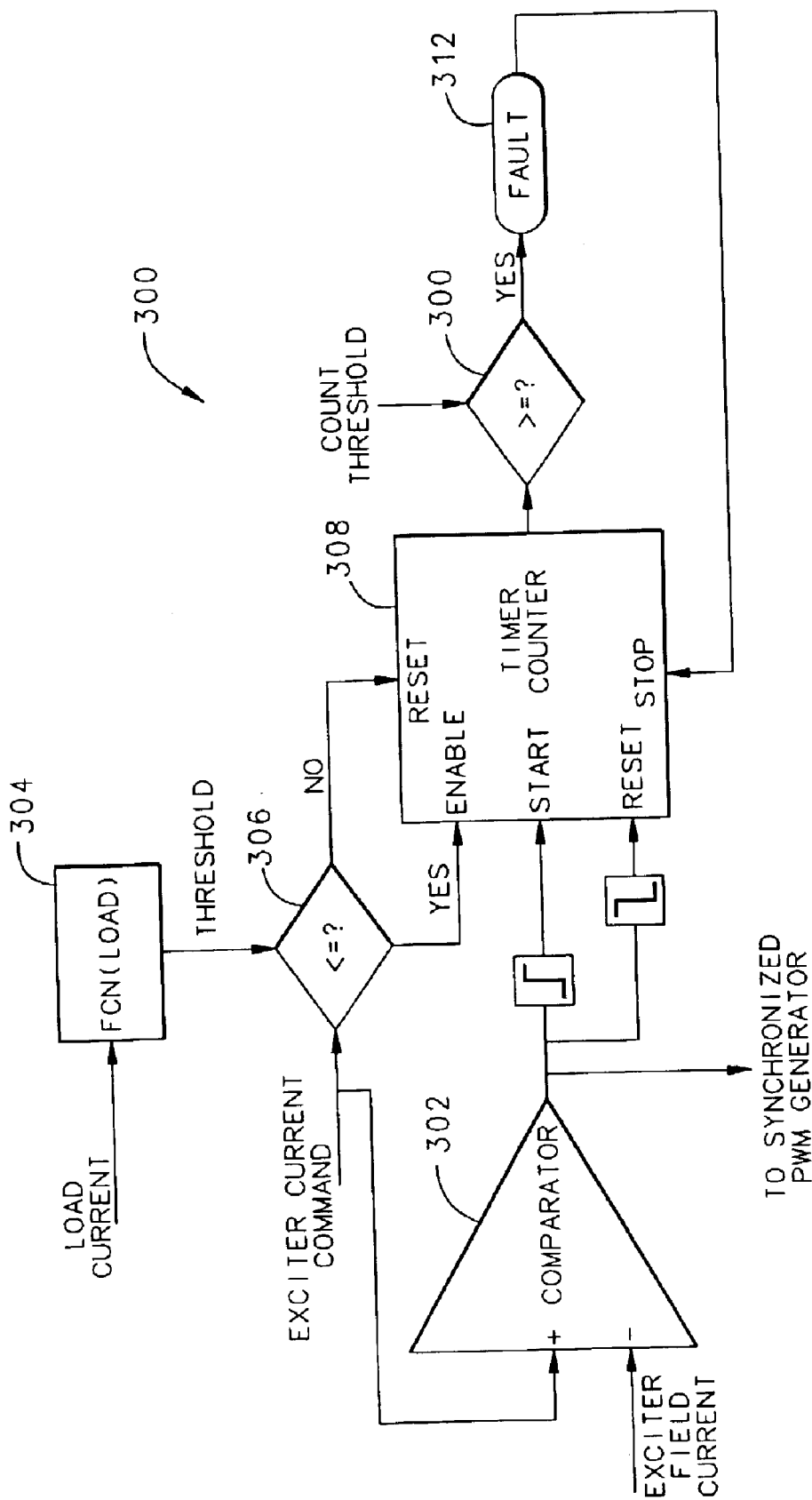
FIG. 5 is a block diagram illustrating a system that turns off an exciter current due to current loop failure.

As noted above, any failures in the generator control unit 116, such as single point failures, may cause the generator control unit 116 to stop regulating the exciter drive circuit 106, causing excessive voltage at the POR 114 to build up. FIGS. 3 through 5 illustrate circuits to be incorporated into the generator control unit 116 to detect various failures and prevent voltage buildup caused by those failures. In each of these cases, the output of the circuit will cause a breaker in the system 100 to turn off before the voltage at the POR 114 reaches undesirably high levels.

FIG. 3 illustrates logic for a three-phase sensor 200 that detects the loss of three-phase sensing capability in the generator control unit 116. The sensor 200 itself can be implemented in the generator control unit 116 through any digital signal processor or even an analog circuit. Generally, the three-phase sensor 200 will detect if there is an broken voltage connection in the generator control unit 116 by checking the magnitudes of the three voltages at any instant in time against a threshold value. Faults can occur if, for example, one or more of the wires carrying phase signals do not connect to the POR 114. If there is a broken connection for all three wires, the generator control unit 116 will normally assume that the voltage at the POR 114 is low and increase the exciter current to the exciter drive circuit 106 to its maximum level.

The instantaneous magnitude of each phase is checked against a voltage threshold (block 202). If the voltage magnitude of all phases is simultaneously lower than the voltage threshold (block 202), it indicates the possibility of a fault.

To prevent false fault triggers, the three-phase sensor 200 also checks whether there is an over-current fault condition detected by the generator control unit itself (block 204), such as a short circuit condition. The short circuit condition can be detected by monitoring the current level of the generator 104 phase currents and generating a fault signal if the current level is above a current threshold. The sensor 200 also includes a timer (block 206) that checks whether the voltage magnitude stays below the voltage threshold for a predetermined amount of time. This ensures that the sensor 200 will ignore cases where the voltage magnitude briefly falls below the voltage threshold. If the voltage magnitude stays below the threshold longer than a predetermined time set by the timer (block 206), then the timer times out and latches a fault. The fault, in turn, turns off excitation by commanding a switch turn-off and a breaker turn-off. The breaker may be, for example, a generator control relay (not shown) in the generator control unit 116 that interrupts the power needed to drive the exciter field.

FIG. 4 illustrates a switch failure detector 250 for detecting a failure in one of the switches 120, 122. As noted above with respect to FIG. 2, the switches 120, 122 control the amount of current through the exciter field coil 124, thereby controlling the voltage at the POR 114. Switch failure will cause loss of control over the voltage at the POR 114, potentially allowing the voltage to rise to undesirable levels. The switch failure detector 250 ensures that both switches 120, 122 will be turned off if one of them fails.

As shown in FIG. 4, the switch failure detector 250 includes a voltage monitor (block 252) that monitors the voltage across the exciter field coil 124. As can be seen in FIG. 2, the voltage across the exciter field coil 124 will alternate between +Vdc (when the switches 120, 122 are turned on) and −Vdc (when the switches 120, 122 are turned off) during normal operation. The voltage monitor 252 will check whether the voltage is properly alternating between +Vdc and −Vdc (block 254); if so, the detector 250 will allow the exciter drive circuit 106 to continue operating normally (block 256). If one of the switches 120, 122 fail in the ON condition, however, the voltage across the exciter field coil 124 will go between +Vdc and the negative sum of the voltage drop of one of the diodes (154 or 155, depending on whether switch 120 or 122 failed) and the switch voltage drop in the exciter drive circuit 106 (e.g., −1V). If the voltage monitor 252 detects this condition, the detector 250 will send a signal to the exciter drive circuit 106 to turn off the remaining functioning switch (block 258).

FIG. 5 illustrates another possible detector 300 that could be incorporated into the generator control unit 116. An exciter current loop failure detector 300 may be used to detect whether the voltage at the POR 114 is higher than a predetermined threshold value and/or whether the voltage at the POR 114 rises at a rate faster than a predetermined threshold rate. As shown in FIG. 5, the exciter field current, which is switched on and off by the PWM generator 123 (FIG. 2), and the exciter current command are both sent to a comparator 302 to ensure that the exciter field current is at the level set by the exciter current command when the switches in the exciter drive circuit 106 are turned on. If the exciter field current exceeds the exciter current command, the comparator 302 will send a signal to the synchronized PWM generator 123 in the exciter drive circuit 106 (FIG. 2) instructing the PWM generator 123 to turn the switches 120, 122 off. In other words, the comparator 302 is used to regulate the exciter field current and maintain the voltage at the POR 114 at a selected level.

During normal operation, the comparator output toggles between a high state and a low state at regular intervals. If the comparator 302 fails, the comparator output may stay at a high level for an extended time period, causing the switches 120, 122 to remain closed at a maximum duty cycle and increase the voltage at the POR 114 to undesirable levels. However, if the electrical load on the system 100 changes, the comparator output stays at a high level for an extended time period as well to leave the switches 120, 122 operating at a higher duty cycle long enough to allow the exciter field current to increase to accommodate the load. The exciter current loop failure detector 300 in this embodiment is designed to distinguish between normal operation and comparator failure.

More particularly, a load current from the generator 104 is input to a load function block 304. The load function block 304 outputs a threshold function that is a function of the load current; in one embodiment, the threshold function is a step function. For example, if the load current is less than a rated load current, then the threshold function will be equal to a first threshold value, while the threshold function will take on a second, higher threshold value if the load current is greater than the rated load current.

If the load is applied, the switches 120, 122 will be switching at a maximum duty cycle to increase the current through the exciter field coil 124 until the generator voltage is at a level corresponding to the new load. The switches 120, 122 will then revert to a steady state switching mode. If the comparator 302 fails, however, the switches 120, 122 may not revert to lower duty cycle switching; instead, they will remain operating at a maximum duty cycle, causing the exciter field current, and therefore the voltage at the POR 114, to keep increasing.

To distinguish between switch closures caused by load changes and switch closures caused by comparator failures, the exciter current command is first compared with the threshold (block 306) set by the load function block (block 304). If the exciter current command is greater than the threshold for the corresponding load, it indicates that the exciter current command is high due to a load application. A signal is then sent to a timer/counter 308 to reset the timer/counter 308, inhibiting the timer/counter 308 to increase. In other words, the timer/counter 308 is prevented from starting counting if the exciter current command is higher than the threshold (block 306) because the extended switch closure is not due to a failure in this case.

The exciter current command is then lowered by the generator control unit 116 until it reaches a level appropriate to the load on the system 100. Once the exciter current command falls below the threshold (block 306), the timer/counter 308 is enabled, allowing the timer/counter 308 to start counting when the output from the comparator 302 goes from low to high. As can be seen in FIG. 5, the timer/counter 308 starts counting when the comparator output goes from low to high and resets when the comparator output goes from high to low when the timer/counter 308 is enabled.

If the comparator 302 is working normally, the comparator output will alternate between high and low levels as a PWM signal. Because the comparator output will reset the timer/counter 308 each time it goes from high to low, the timer/counter 308 will stay below a selected threshold (block 310) during normal operation. If, however, a fault in the comparator 302 causes the comparator output to stay high (and therefore cause the synchronized PWM generator 123 to keep the switches 120, 122 on at a maximum duty cycle), the timer/counter 308 will continue counting without resetting. The timer/counter 308 will therefore eventually exceed the count threshold and cause the generator control unit 116 to indicate a fault condition (block 312).

In one embodiment, the timer/counter 308 cannot be reset by the comparator 302 if a fault condition is detected; it can only be reset by other means, such as a processor in the generator control unit 116. In other words, the timer/counter 308 is stopped altogether if the comparator 302 malfunction causes the timer/counter 308 to exceed the counter threshold (block 310). As a result, the exciter current loop failure circuit 300 distinguishes between extended switch closings due to load changes and extended switch closings due to comparator failures.

All of the detectors described above can be implemented in the generator control unit 116 at least in part by a digital signal processor and/or any known hardware (e.g., FPGA).

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A variable frequency generator, comprising:
    an exciter drive circuit having an exciter field coil, a first switch and a second switch, wherein the exciter drive circuit controls an output voltage at a point of regulation; and
    a generator control unit that sends a switching signal to the first switch and the second switch to control switching of the first and second switches and that generates an exciter current command to regulate the first and second switches to control the output voltage, the generator control unit comprising at least one fault detection circuit that detects and protects against a fault in at least the exciter drive circuit and the generator control unit.

2. The variable frequency generator of claim 1, wherein said at least one detection circuit is one selected from the group consisting of a three-phase voltage sensing loss detector, a switch failure detector, and an exciter current loop failure detector, and wherein the generator control unit turns off the first switch and the second switch if said at least one detection circuit indicates a fault condition.

3. The variable frequency generator of claim 2, wherein the three-phase voltage sensing loss detector indicates the fault condition if instantaneous values of all three-phase voltages fall below a predetermined threshold.

4. The variable frequency generator of claim 2, wherein the switch failure detector indicates the fault condition if a voltage across the exciter field fails to cycle between a positive reference voltage and a negative reference voltage.

5. The variable frequency generator of claim 2, wherein the exciter current loop failure detector comprises a comparator, a threshold detector, and a timer/counter, wherein the timer/counter counts when a comparator output is at a first level and resets when the comparator output goes from the first level to a second level, and wherein the exciter current loop failure detector indicates the fault condition if an output from the comparator stays at the first level for longer than a count threshold.

6. The variable frequency generator of claim 5, wherein the threshold detector compares the exciter current command with a threshold corresponding to a load on the variable frequency generator, and wherein the timer/counter is reset if the exciter current command exceeds the threshold to distinguish between an application of the load and the fault condition.

7. The variable frequency generator of claim 1, wherein said at least one detection circuit comprises a three-phase voltage sensing loss detector, a switch failure detector, and an exciter current loop failure detector, and wherein the generator control unit turns off the first switch and the second switch if said at least one detection circuit indicates a fault condition.

8. A method of detecting a fault condition in a variable frequency generator, comprising:

generating an exciter current command in a generator control unit;

sending the exciter current command to an exciter drive circuit having a first switch, a second switch, and an exciter field coil to control an output voltage at a point of regulation;

sending a switching signal to the first switch and the second switch to control switching of the first and second switches; and detecting a fault condition in at least the exciter drive circuit and the generator control unit, wherein the fault condition is at least one selected from the group consisting of a three-phase voltage sensing loss, a switch failure, and an exciter current loop failure; and turning off the first switch and the second switch upon detecting the fault condition.

9. The method of claim 8, wherein the step of detecting the three-phase voltage sensing loss comprises:

detecting instantaneous values of all three-phase voltages; and indicating the fault condition if the instantaneous values of all three-phase voltages fall below a predetermined threshold.

10. The method of claim 8, wherein the step of detecting the switch failure comprises indicating the fault condition if a voltage across the exciter field fails to cycle between a positive reference voltage and a negative reference voltage.

11. The method of claim 8, wherein the step of detecting the exciter current loop failure comprises:

counting in a timer/counter when a comparator output in the generator control unit is at a first level and resetting the timer/counter when the comparator output goes from the first level to a second level; and indicating the fault condition if an output from the comparator stays at the first level for longer than a count threshold.

12. The method of claim 11, wherein the step of detecting the exciter current loop failure further comprises:

comparing the exciter current command with a threshold corresponding to a load on the variable frequency generator;

and resetting the timer/counter if the exciter current command exceeds the threshold to distinguish between an application of the load and the fault condition.

* * * * *